Patented July 13, 1954

2,683,727

UNITED STATES PATENT OFFICE 2,683,727

MONOADDUCTS OF POLYISOCYANATES AND SECONDARY AROMATIC AMINES

Thomas G. Mastin, Akron, and Nelson V. Seeger, Cuyahoga Falls, Ohio, assignors, by mesne assignments, to The Goodyear Tire & Rubber Company, a corporation of Ohio No Drawing. Application November 1, 1950, Serial No. 193,511

7 Claims. (Cl. 260—453)

This invention relates to new compositions of matter and to a method for preparing the same. More particularly, it relates to mono (diaromatic urea) substituted organic isocyanates and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055 and Serial No. 170,056 now abandoned. According to the present invention, a means is provided for controlling the reactivity of polyisocyanates.

The broad object of this invention is to provide a new class of chemical compounds from polyisocyanates and secondary aromatic amines. It is a particular object to provide a new class of chemical compounds some of which are useful as delayed-action curing or cross-linking agents for diisocyanate-modified polyesters and polyesteramides. It is another object of this invention to provide as new compositions of matter the mono-adducts of polyisocyanates and secondary aromatic amines. A specific object is to prepare the monoadducts of polyiscyanates and secondary aromatic amines in which the reactivity of the polyfunctional character of the polyiscoyanate may be controlled.

A convenient method for the preparation of the new compounds to which this invention relates may be represented by the following equation:

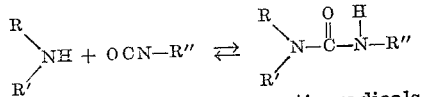

in which R and R' are aromatic radicals, and R'' is an organic radical which contains at least one —NCO group.

It will be noted that the reaction between the polyisocyanate and the secondary aromatic amine is a reversible reaction, the direction of which may be controlled by temperature. The mono-adduct of the polyisocyanate and the secondary aromatic amine is formed at relatively low temperatures while the formed mono-adduct dissociates into the polyisocyanate and the amine at relatively high temperatures in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer.

The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanto triphenyl methane, 1,3,5-triisocyanto benzene, and 2,4,6-triisocyanto toluene; and the tetraisocyanates such as 4,4'-dimethyldiphenyl methane 2,2',5,5' tetraisocyanate.

Any secondary aromatic amine may be used in the formation of the mono-adducts, providing such amine has only one group containing hydrogen reactive with the —NCO group. Representative examples are the diaryl compounds which are preferred, such as diphenyl amine, o-ditolyl amine, m-ditolyl amine, p-ditolyl amine, N-pehnyl toluidine, N-phenyl xylidine, phenyl alpha naphthylamine, phenyl beta naphthyl amine, carbazole, and the nuclear substituted aromatic compounds such as 2,2' dinitro diphenyl amine and 2,2' dichloro diphenyl amine.

Certain preferred mono-adducts are those resulting from the reaction of a secondary aromatic amine and any one of the following:

1. 4,4'-diphenyl diisocyanate
2. 2,4-tolylene diisocyanate
3. 1,5-naphthalene diisocyanate
4. hexamethylene diisocyanate Specific mono-adducts which are preferred are those resulting from the reaction of:

1. Diphenyl amine and 4,4'-diphenyl diisocyanate
2. Diphenyl amine and 2,4-tolylene diisocyanate
3. Diphenyl amine and 1,5-naphthalene diisocyanate
4. Diphenyl amine and hexamethylene diisocyanate
5. Phenyl beta naphthyl amine and 4,4'-diphenyl diisocyanate
6. Phenyl beta naphthyl amine and 2,4-tolylene diisocyanate
7. Phenyl beta naphthyl amine and 1,5-naphthalene diisocyanate
8. Phenyl beta naphthyl amine and hexamethylene diisocyanate.

In the preparation of the mono-adducts in general, the polyisocyanate and the diaromatic amine are usually dissolved in a suitable inert solvent such as toluene, methyl ethyl ketone, or o-dichlorobenzene. The solutions are stirred together and permitted to stand. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided so that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of mono (diaromatic urea) substituted organic isocyanates is illustrated by the following examples which are to be interpreted as representative rather than restrictive of the scope of this invention.

Example 1

4,4' diphenyl diisocyanate (35.4 grams or 0.15 mol) was dissolved in 390 grams of toluene by heating. The solution was filtered to remove any undissolved solids. To this solution was added 0.10 mol of phenyl beta naphthyl amine with stirring. The mono-adduct separated from solution. The product was removed from solution by filtering, leaving the unreacted material in solution. The yield of this first-crop separation was 8.7 grams of the mono-adduct.

Example 2

4,4' diphenyl diisocyanate (35.4 grams or 0.15 mol) was dissolved in 390 grams of toluene by heating. The solution was filtered to remove any undissolved solids. To this solution was added 0.10 mol of diphenyl amine with stirring. The mono-adduct separated from solution and was removed by filtering, leaving the unreacted material in solution. The yield of this first-crop separation was 8.7 grams of the mono-adduct.

While certain representative embodiments and details have been shown for the purpose of illustrating the invention, it will be apparent to those skilled in the art that various changes and modifications may be made therein without departing from the spirit or scope of the invention.

We claim:

1. As new compositions of matter, the mono- (di-aromatic substituted urea) substituted organic isocyanates corresponding to the following formula

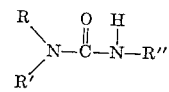

in which R and R' are aromatic radicals free of groups reactive with isocyanate groups and R'' is an organic radical containing at least one isocyanate group, and selected from the group consisting of aliphatic, cycloalkylene, aromatic, and nuclear substituted aromatic radicals.

2. The compositions defined by claim 1 in which R and R' are phenyl radicals.

3. The compositions defined by claim 1 in which R'' is

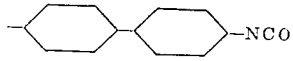

4. The compositions defined by claim 1 in which R'' is

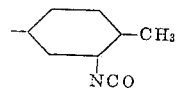

5. The compositions defined by claim 1 in which R'' is

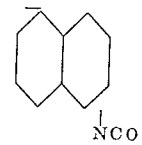

6. The compositions defined by claim 1 in which R'' is $-(CH_2)_6-NCO$.

7. The method of making mono (di-aromatic urea) substituted organic isocyanates which comprises reacting approximately equal molecular amounts of polyisocyanate selected from the group consisting of aliphatic, cycloalkylene, aromatic, and nuclear-substituted aromatic polyisocyanates with a secondary aromatic amine in which there is only one group containing hydrogen reactive with an isocyanate group, said reaction being carried out at a temperature below 100° C.

References Cited in the file of this patent

Bayer, Modern Plastics, June 1947, pages 149, 151, 152.

B. I. O. S. Report No. 719 received Patent Office March 12, 1948 pages 1–4.